United States Patent [19]

Walton

[11] 4,374,309
[45] Feb. 15, 1983

[54] MACHINE CONTROL DEVICE

[76] Inventor: Russell C. Walton, 106 Center Ave., Libertyville, Ill. 60048

[21] Appl. No.: 171,881

[22] Filed: Jul. 28, 1980

Related U.S. Application Data

[63] Continuation-in-part of Ser. No. 44,651, Jun. 1, 1979, Pat. No. 4,365,122.

[51] Int. Cl.$^3$ .......................... H01H 3/16; F16D 9/00
[52] U.S. Cl. .............................. 200/61.42; 192/129 A
[58] Field of Search ................. 200/61.42; 192/129 R, 192/129 A, 130, 132, 134; 219/108; 335/69

[56] References Cited

U.S. PATENT DOCUMENTS

| | | | |
|---|---|---|---|
| 3,315,049 | 4/1967 | Cain | 200/61.42 |
| 3,487,182 | 12/1969 | Grundy | 200/61.42 |
| 3,496,315 | 2/1970 | Giesel, Jr. et al. | 335/69 X |
| 3,939,314 | 2/1976 | Loeser | 200/61.42 |
| 4,266,221 | 5/1981 | Hawkins | 192/129 A |

Primary Examiner—J. R. Scott
Attorney, Agent, or Firm—Wegner, McCord, Wood & Dalton

[57] ABSTRACT

A machine control system for sensing an obstruction in the path of a machine tool and preventing movement of the tool along its path while requiring operator initiation for each machine tool actuation. A sensor is mounted on a movable support rod and adjustably positioned to move along a path coaxial with the path of the tool in order to sense any obstruction in a work area. The movable support rod is constructed to allow gravity fall of the sensor into the work area and to cause actuation of a switching circuit allowing machine tool movement if no obstructions are sensed. A spring-biased arm coupled to a rotary solenoid retains the movable support rod in a rest position. Upon actuation, the solenoid rotates the arm so that gravity causes the support rod to fall and the sensor to move into the work area. A normally closed switch is positioned to open in response to the end stroke of machine tool movement. If no obstructions are sensed and the machine tool is activated, it cannot be reactivated without separate operator initiation.

11 Claims, 6 Drawing Figures

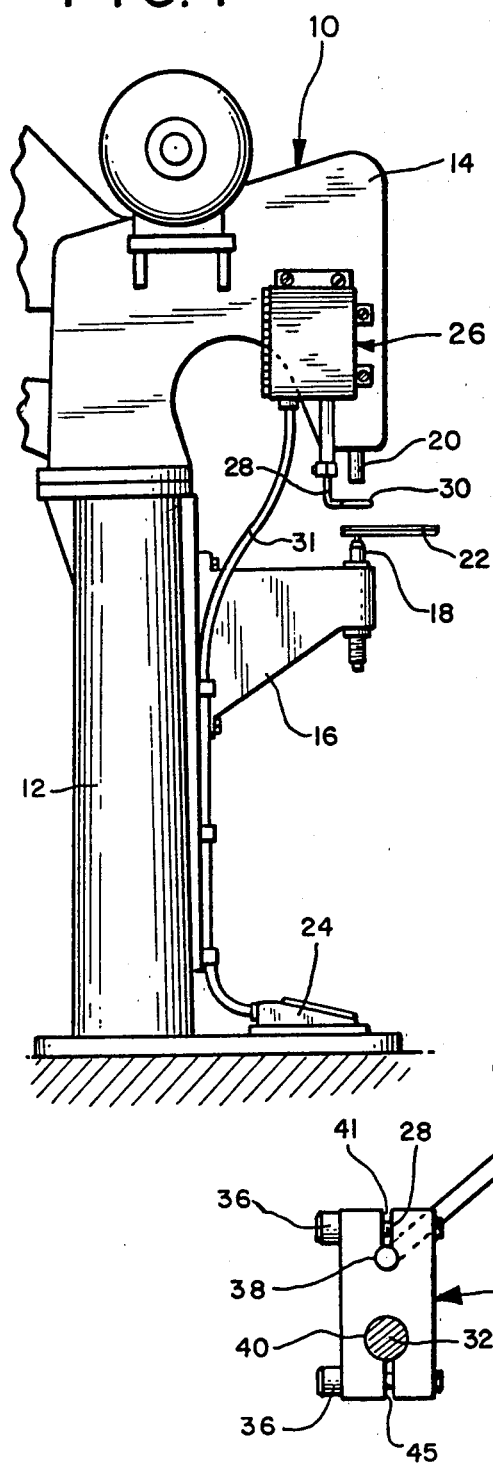
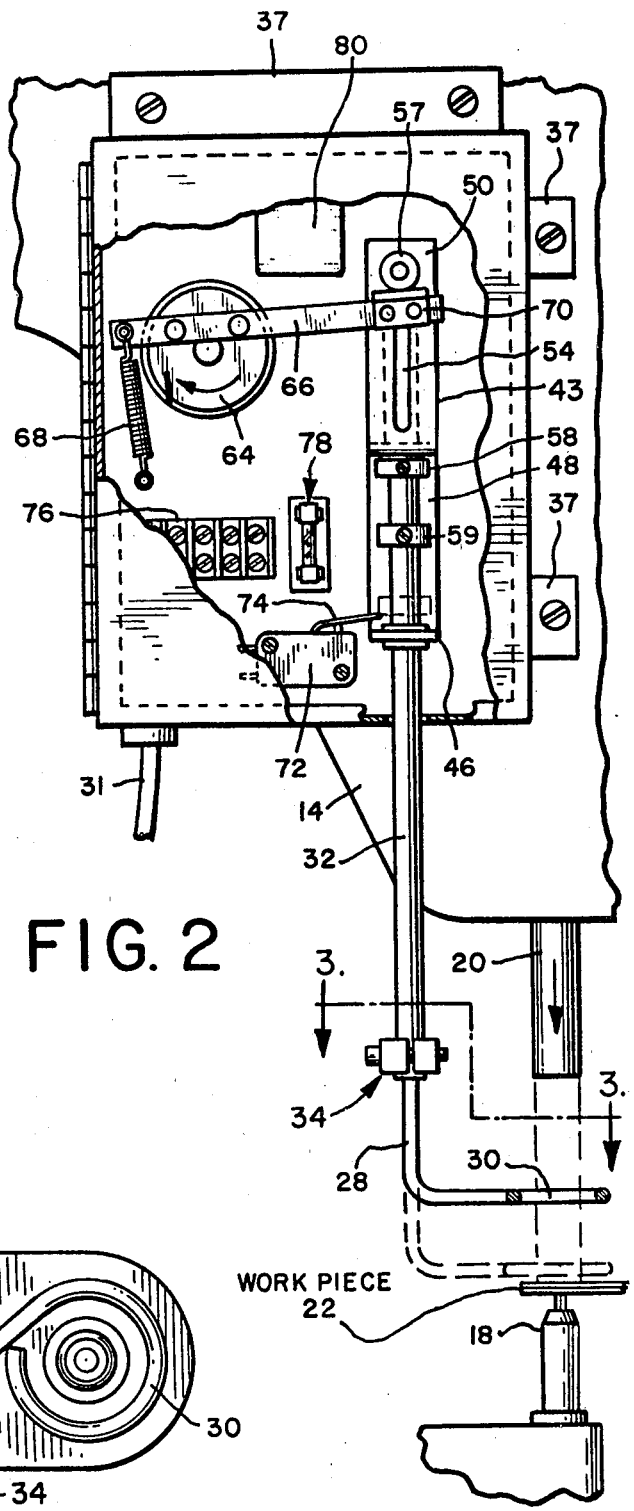

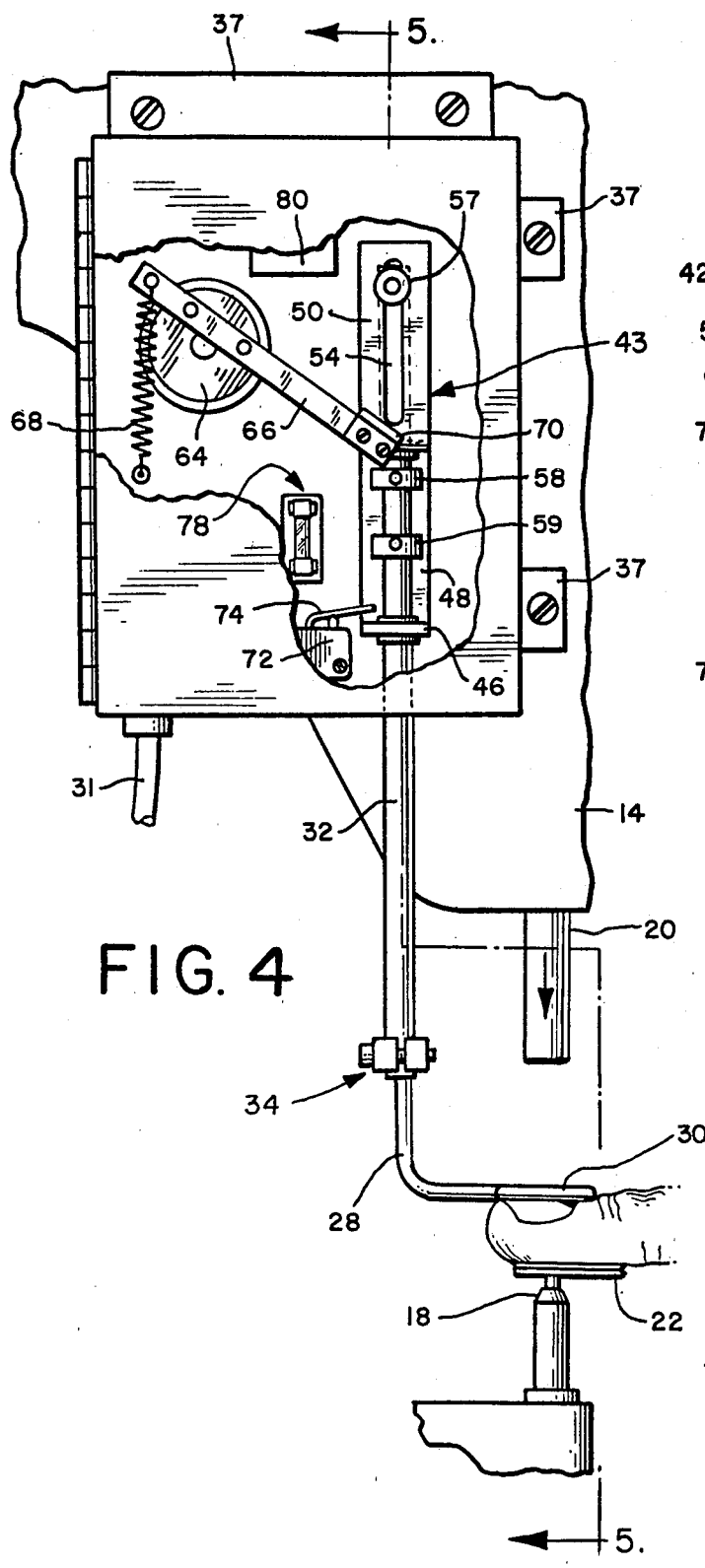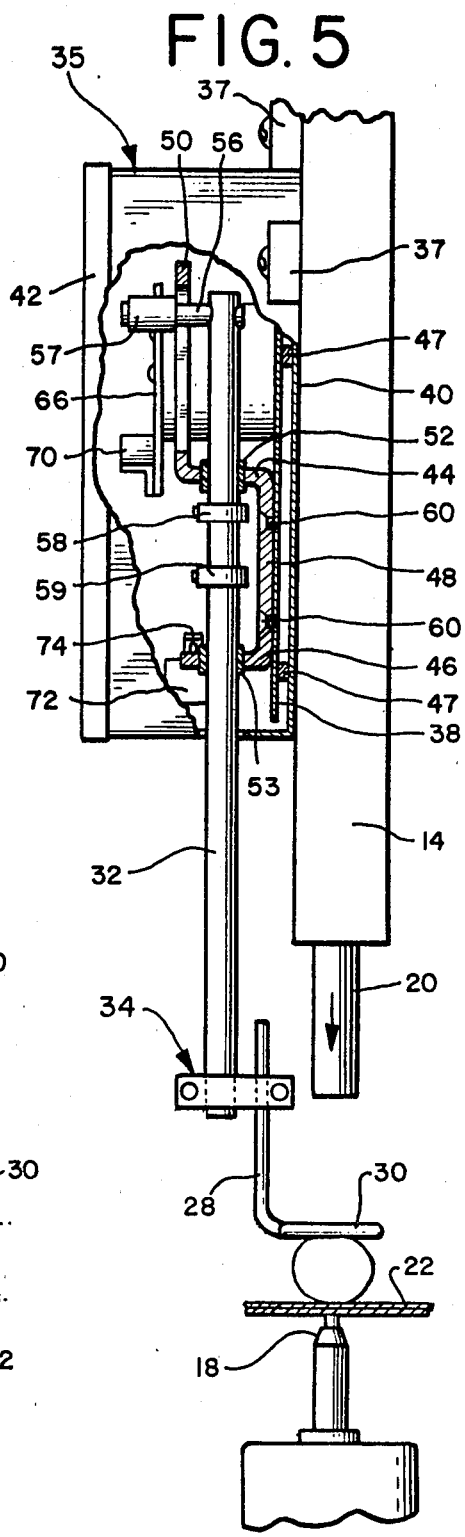

MACHINE CONTROL DEVICE

BACKGROUND OF THE INVENTION

This application is a continuation-in-part of the Russell C. Walton U.S. application Ser. No. 044,651, filed June 1, 1979 now U.S. Pat. No. 4,365,122 and entitled "MACHINE CONTROL DEVICE" which is herein incorporated by reference.

The present invention relates to improvements in machine controls and more particularly, to a system for sensing obstructions in the tool path of machines and limiting machine tool actuation in machines used for welding, pressing, riveting and the like.

In spite of the increased complexity and trend toward automation of many machine processes, certain control devices are still required to reduce the danger to machine operators and to prevent damage to expensive machines from improper operation. While various types of devices are known, each generally employs a sensor which is introduced into a work area prior to the initiation of machine tool movement. The movement of the sensor is initiated by the operator or by automatic control, but movement of the machine tool is conditioned upon the sensor not encountering any obstructions in the work area. In this manner, operator error and automatic controls cannot cause initiation of machine tool movement when obstructions may cause an unsafe condition in the work area.

In spite of the variety, prior art devices tend to be constructed for use in connection with a specific machine, thereby limiting their usefulness with many different machines. In addition, the devices have been constructed with numerous special parts and complex mechanical arrangements which increase the cost and repair time of each mechanism. As a result, their use decreases the efficiency of machine operation and encourages their bypass or elimination in order to continue machine operation. Since a primary concern is for operator safety, it is highly desirable to employ devices which will operate effectively for long periods of time as well as discourage and prohibit operation of a machine in an unsafe condition.

In one particular example shown by U.S. Pat. No. 3,487,182 to Grundy, a device is shown which employs a movable rod supporting a sensor which in turn moves co-axially along the path of machine tool movement. A plurality of guide blocks and special support configurations are used to position the sensor while additional elements are required to control the rate of gravity fall of the sensor into the work area. In addition, a special spring-yoke lever mechanism, directly connected to one end of the rod, is used to position and release the sensor. While the device appears to provide for effective sensing of obstructions and subsequent machine tool control, its complexity increases the likelihood of malfunction and decreases its versatility for use with a variety of machines.

Accordingly, the present invention has been developed to overcome the specific shortcomings of the above known and similar techniques, and to provide a less complex mechanism for controlling machine tool operation.

SUMMARY OF THE INVENTION

It is therefore a feature of the invention to provide a machine control system which is simple and inexpensive in construction and readily adaptable for use with a variety of machines.

Another feature of the invention is to provide a machine control system which employs a simple guide for controlling the position of a sensor in a work area.

A further feature of the invention is to provide a machine control system which employs a sensor that may be readily adjusted to accommodate various operating conditions.

Still another feature of the invention is to provide a machine control system which is less subject to wear and which facilitates easy removal and replacement for repair.

A still further feature of the invention is to provide a machine control system which initiates machine tool movement in response to sensor position.

Yet another feature of the invention is to provide a machine control system which employs a spring-biased arm activated by a rotary solenoid to control gravity fall of the sensor.

Still another feature of the invention is to provide a machine control system which employs a relay circuit which prevents multiple machine tool activations or bypass without independent operator initiation.

A still further feature of the invention is to provide a machine control system which includes a normally closed switch for sensing the end of a machine tool stroke and limits reactivation of the machine tool.

These and other features are provided by adjustably coupling a sensor to a movable support rod guided for movement along a path generally parallel to the path of machine tool movement. A simple guide is mounted to a backing plate which is removably attached to a machine. The guide controls the movement of the support rod and the associated sensor in the work area. A roller projecting from the rod is coupled to engage a spring-biased arm mounted for rotation to a rotary solenoid attached to the backing plate. In its rest position, one end of the arm engages the roller to retain the sensor in a position removed from the workpiece. Upon activation, the solenoid rotates the arm from under the roller allowing the rod and sensor to fall by gravity into a work area. An adjustable collar located on the rod activates a switch connected to the backing plate if no obstructions are encountered in the work area. The switch in cooperation with a relay circuit initiates movement of the machine tool. A normally closed end-of-stroke switch positioned to sense the completion of a machine tool movement is coupled in the relay circuit to prevent multiple cycles of machine tool movement without separate operator initiation.

Other advantages and novel features of the invention will become apparent from the following detailed description of the invention when considered with the accompanying drawing wherein:

BRIEF DESCRIPTION OF THE DRAWINGS

FIG. 1 is a fragmentary side view of a machine utilizing the control device of the present invention.

FIG. 2 is a detailed fragmentary side view of the device shown in FIG. 1.

FIG. 3 is a cross-sectional view taken along the line 3—3 in FIG. 2.

FIG. 4 is a fragmentary side view of the device shown in FIG. 1 illustrating the position of the elements when an obstruction is encountered.

FIG. 5 is a fragmentary cross-sectional view taken along the line 5—5 in FIG. 4.

DESCRIPTION OF A PREFERRED EMBODIMENT

Figure 6:
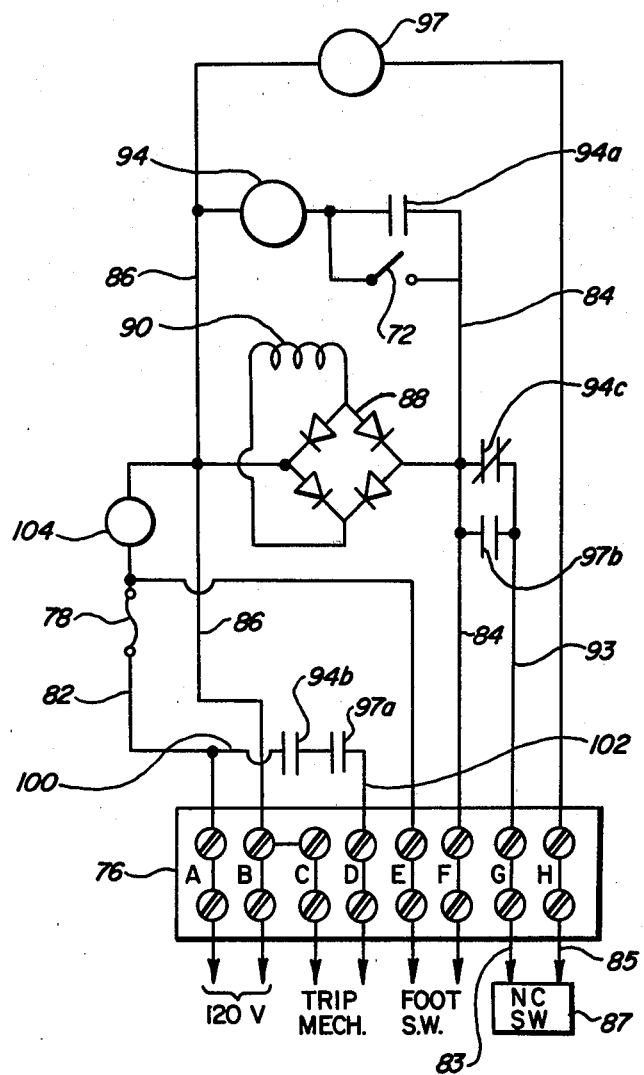
FIG. 6 is a schematic diagram of the wiring and control circuitry for the device of FIGS. 1-5.

Referring now to the drawings, wherein like numerals are used to designate like elements throughout, FIG. 1 generally shows a machine 10 having a base portion 12 on which is mounted a head portion 14 and a support bed 16. The machine 10, which could be a punch press, welder, or any other similar prior art device, employs a stationary tool 18 held by the support 16, and a movable tool 20 coaxially aligned above the stationary tool 18. The machine 10 is normally operated to cause movement of the tool 20 linearly along a path towards the workpiece 22 by a foot switch 24 when a machine control system is not employed. The specific operation and construction of machines of this type are well known and will therefore not be described in any more detail than is necessary to facilitate an understanding of its cooperation with the invention.

In accordance with a preferred embodiment of the invention, a machine control 26, having a sensor extending into the work area, is attached to the head portion 14 to allow for detection of obstructions in the work area between the tools 18 and 20. As is more particularly shown in FIGS. 2, 4 and 5, the device 26 includes a sensor generally formed by a vertical rod 28 terminating in a loop 30 which extends angularly from the rod 28. The loop 30 has an axis through its center which is coaxial to the path of the movement of the tool 20. The sensor is located so that movement of the loop along its axis will be prevented when any obstruction appears between the tools 18 and 20.

With reference to FIG. 3, the sensor is adjustably connected to a movable support rod 32 by frictional retention in split-block 34. The block 34 includes channels 38 and 40 receiving rods 28 and 32, respectively, for maintaining the rods substantially parallel to one another. The block 34 includes slots 41 and 45 cut through the block along the length of the channels and fasteners 36 extending through one side of the block generally perpendicular across the slots and threaded into the other side of the block. The cooperation of the fasteners 36 and the slotted portions of the block, allows frictional engagement of block 34 at any desirable position along the length of each rod 28 and 32. As a result, the position of the loop sensor 30 can be vertically adjusted along its axis in relation to the tools 18 and 20 and horizontally adjusted by rotation of shaft 28 in its channel in block 34.

Referring now to FIGS. 2 and 5, the elements of the control device are shown attached to a plate 38 which is removably mounted to spacing projections 47 extending from the vertical wall 40 of enclosure 35 and spacing the plate 38 so that it is generally parallel to the wall 40. Access to and removal of the plate 38 from enclosure 35 is provided by a hinged cover 42. The support rod 32 extends through a hole in the enclosure which is mounted on head 14 in a conventional manner by brackets and fasteners 37. A guide bracket 43 is attached to the plate 38 by fasteners 60 and positioned to guide the vertical movement of the support rod 32. The guide is constructed to have two opposing parallel plate members 44 and 46 connected by a third plate member 48 extending orthogonally therebetween. A fourth plate member 50 extends orthogonally from the opposite end of the member 44 in a vertical direction parallel to the plate member 48. Plate members 44 and 46 have vertically aligned openings extending therethrough which retain bearing members 52 and 53. Member 50 has a slot 54 extending along its length parallel to an axis through the center of bearing members 52 and 53. The support rod 32 is slidably retained by the bearing members to allow movement of the rod vertically through said members generally parallel to plate 38. In addition, the support rod has an angularly projecting rod 56 extending through the slot 54 which retains a horizontally disposed roller 57 thereon. The rod 56 is slidably retained by the slot 54 to prevent rotation of rod 32 and accurately control movement of sensor 30.

Collars 58 and 59 are disposed along a portion of the rod 32 extending between the bearing members 52 and 53. The collars may be fixed at any position on the rod between the members 52 and 53 by conventional set screw engagement. For this purpose, a flat surface may be formed along the length of a portion of the rod 32 to improve seating of the set screws on the rod. By controlling the vertical position of the collars along the identified portion of the rod 32, the stroke or range of movement of the support rod, and therefore the attached sensor, can be adjustably controlled.

A rotary solenoid 64 is attached to the base plate 38 and supports an arm 66 extending parallel to the base plate 38. One end of the arm 66 is attached to a spring 68 which in turn is attached to the base plate 38 in any conventional manner. The opposite end of the arm 66 has an angular member 70 attached thereto which provides a flat surface for engagement with the roller 57. The solenoid, arm and spring arrangement are positioned on the backing plate 38 in relation to the guide so that the spring 68 normally biases a surface of member 70 against the roller 57 to maintain the support rod in a position fixed by adjustment of the upper collar 58 when it abuts against upper bearing 52. When activated, the rotary solenoid rotates the arm 66 against the spring bias so that the surface of element 70 moves downwardly away from the roller 57 allowing the rod 32 to fall by the force of gravity.

A limit switch 72 is also mounted to the plate 38 and includes a switch arm 74 which closes the switch contacts when depressed. In the configuration shown, the switch arm 74 is positioned in the path of the lower collar 59 so that when the collar reaches a set position, following movement of the rod 32, the switch arm will be depressed by the collar and close the contacts of the switch 72.

Referring again to FIG. 2, a connector block 76, fuse and holder 78, and relays 94 and 97 are also attached to the base plate 38 and are connected to provide the electrical circuitry needed to cause movement of the tool 20 when no obstructions are detected by the sensor 30. As shown in FIG. 6, the connector block receives power at terminals A and B which in the present example is a conventional 120 v alternating current two wire source. The output leads from foot switch 24 are connected via cable 31 to terminals E and F. Terminals C and D provide an output which may be coupled to any conventional mechanism for initiating movement of the machine tool 20. Terminals G and H are coupled via lines 83 and 85 to a switch 87. The switch 87 has normally closed contacts and is mounted on the machine so that the normally closed contacts are opened only at the end of the machine tool stroke. The particular mounting details to accomplish the above are not important, it being understood that any conventional construction or technique capable of causing the switch 87 to open at the end of the machine tool stroke will suffice.

Terminal A is coupled, via line 82, through fuse 78 and foot switch 24, via terminals E and F, to line 84. Terminal B is coupled to terminal C and to line 86. Lines 84 and 86 then provide 120 v bias to a conventional full wave rectifier 88 upon closure of foot switch 24. The output of the rectifier 88 is coupled to coil 90 which causes rotary solenoid 64 to move arm 66 and element 70 from under the roller by clockwise rotation. Limit switch 72 has one terminal connected to line 84, and the other connected to a first terminal of relay 94. Relay 94 has its other terminal connected to line 86. In addition, one set of normally open relay contacts 94a, operated by relay 94, are coupled between line 84 and the first terminal of relay 94.

A second relay 97 has one terminal coupled to line 86 and its other terminal to terminal H. Normally closed contacts 94c, operated by relay 94, and normally open contacts 97b, operated by relay 97, are coupled in parallel between lines 84 and 93. Further, normally open contacts 94b and 97a, operated by relays 94 and 97, respectively, are serially coupled between terminals A and D via lines 100 and 102. A pilot light 104 is also connected between lines 82 and 86 to indicate when power is applied to terminals A and B.

The operation of the control device will now be described with particular reference to FIGS. 2, 4 and 6. Initially, the device 26 is attached to the machine head 14 in order to allow positioning of the sensor between the tools 18 and 20. At the same time, the terminals from foot switch 24 are coupled via cable 31 to connector block 76 in the manner described. The outputs from terminals C and D on the connector block are coupled to the appropriate device for activating the tool 20. Adjustments of the sensor height and horizontal position may be made by movement of collars 58 and 59 and block 34 as has been previously described. Prior to depression of the foot switch 24, the bias of spring 68 holds the arm so that the surface of element 70 bears against roller 57 and holds the sensor in a position removed from the workpiece 22 fixed by adjustment of collar 58 abutting against upper bearing 52. In order to start the operation, foot switch 24 is depressed to apply power through the connector block to rectifier 88 and coil 90 and cause clockwise rotation of the arm 66. Power is also applied via normally closed relay contact 94c and normally closed switch contacts 87 to relay 97 which causes closing of normally open relay contacts 97a and 97b. As the arm 66 moves by rotation, the surface of element 70 moves down followed by roller 57 remaining in contact therewith allowing rod 32 and sensor 30 to move vertically downward under the force of gravity. If no obstructions are encountered, the sensor descends to a point very near the surface of the workpiece 22 at which time collar 59 contacts switch arm 74 causing closure of the contacts of switch 72. Lower bearing 53 then limits further movement of the rod 32 when collar 59 moves into contact with it. As can be noted, the spacing allowed between the sensor 30 and workpiece 22 can be adjusted by the position of lower collar 59 to accommodate various size workpieces and still provide the sensing of obstructions.

When the contacts of switch 72 close, power is applied to relay 94 via lines 84 and 86 causing the relay to close its normally open contacts 94a and 94b and open its normally closed contacts 94c. At this time, the relay 94 becomes locked in circuit causing power to remain coupled to terminals C and D for activation of the tool 20. Once contacts 94a are closed, power will be applied to move tool 20 so long as foot switch 24 is depressed regardless of the status of the contacts of switch 72. Thus, the circuit provides for the application of only one power pulse under the control of foot switch 24 even if the sensor bounces or otherwise causes the limit switch contacts to open after a detection of no obstruction.

When the machine tool reaches the end of its stroke, normally closed switch 87 is opened. At this time, power to relay 97 is interrupted thereby causing relay contacts 97a and 97b to return to their normally open condition. When relay contact 97a returns to its normally open condition, power to cause tool movement is interrupted and the machine tool returns to its original position while allowing the contacts of switch 87 to again close. Since relay 94c is also open as long as the foot switch 24 is closed, the relay 97 cannot again be energized (and thus machine tool movement cannot occur) until foot switch 24 is opened by the operator and again closed to start another machine cycle.

Turning now to FIG. 4, if an obstruction, such as an operator's finger or hand or any other impediment, prevents the fall of the sensor to a position near the surface of workpiece 22, the collar 59 will not be able to move to depress switch arm 74 even though arm 66 continues to rotate. In this instance, the contact of switch 72 will not be closed and no power will be applied to relay 94 to enable application of power through terminals C and D. Thus, so long as an obstruction is in the path of the tool 20, tool movement will be prohibited. Once the obstruction is removed, however, the sensor will again be able to fall to the surface of the workpiece allowing collar 59 to depress switch arm 74 and closing the contacts of switch 72 to initiate machine tool movement as has been previously described.

As can be seen from the above description, the present invention provides a machine control system which is simple in construction and operation and which may be effectively employed to sense obstructions in the path of machine tools and restrict improper machine tool cycling. The use of a removable plate to mount the elements of the control device within an enclosure allows the device to be easily repaired. The plate may be removed for repair and replacement of parts while another plate is substituted to continue machine operation. This increases the efficiency of the machine by minimizing its period of inactivity and discourages any tendency to bypass or eliminate such devices. In addition, since all elements are constructed from readily available stock, there is no need for specially fabricated components or circuits. Further, the use of the arm supported by the rotary solenoid to control gravity fall of the support rod reduces the complexity of the mechanical arrangement for controlling sensor movement and lessens the wear that is normally encountered in other complex mechanical assemblies. The particular guide structure also simplifies control of sensor movement and positioning and reduces the likelihood of sensor misalignment or malfunction. In contrast to prior systems, the present device, by use of the locking relay circuit, also prevents interruption of machine operation by inadvertent or intentional movement of the sensor once the work area has been sensed clear of any obstructions. Finally, the specific relay circuit in cooperation with the normally closed end-of-stroke sensing switch limits improper machine operation by requiring specific operator initiation through the foot switch or similar control to recycle the machine tool. As a result, operator manipulation of the sensor cannot produce machine cycling independent of foot switch control.

Obviously, many modifications and variations of the present invention are possible in light of the above teachings. For example, the end of stroke sensing switch and associated relay circuitry may also be employed with the sensor apparatus shown in FIGS. 7–9 of the aforesaid U.S. application Ser. No. 044,651. It is therefore to be understood that within the scope of the appended claims the invention may be practiced otherwise than as specifically described.

I claim:

1. A machine control system for controlling the movement of a machine tool along a path comprising:
   a movable support rod;
   a sensor coupled to said movable support rod;
   mounting means coupled to slidably retain said support rod for movement along an axis;
   a limit switch coupled to said mounting means to be closed upon movement of said sensor to a preselected position;
   means coupled to said support rod for closing said limit switch during movement of the rod along said axis;
   means extending from said support rod;
   a movable arm having one end positioned in contact with and beneath said extending means so that said extending means rests thereon;
   means coupled to said mounting means and to said arm for moving said arm to allow said rod and sensor to move along said axis;
   actuator switch means electrically coupled to said moving means for selectively providing power to said moving means as an incident of actuation of said actuator switch means;
   relay means responsive to said actuator switch means and to closure of said limit switch for providing power to cause movement of a machine tool;
   a disconnect switch means coupled to said relay means and responsive to the end of a machine stroke for terminating said power causing machine tool movement; and
   control circuitry means for causing said relay means to maintain power to cause movement of the machine tool as long as said actuator switch means remains actuated regardless of the condition of said limit switch whereby continued movement of the machine tool may be effected notwithstanding movement of the sensor from said preselected position subsequent to movement thereto.

2. The machine control system of claim 1 wherein said limit switch closing means is coupled to close said limit switch during said movement only if no obstructions are encountered by the sensor during its movement when positioned to move along the path of a machine tool.

3. The machine control system of claim 2 further including means coupled to said mounting means and to said arm for biasing said arm against the force of gravity, and wherein said means for moving said arm is coupled to move said arm against said bias.

4. The machine control system of claim 1 further including
   a connector block, and
   a source of power coupled to said connector block, said actuator switch means, relay means and normally closed switch means being coupled to said connector block for providing and sensing power from said source of power.

5. The machine control system of claim 4 wherein said connector block and said relay means are coupled to said mounting means.

6. The machine control system of claim 1 wherein said actuator switch means comprises a foot operable switch.

7. A machine control system for controlling the movement of a machine tool along a path comprising:
   a movable support rod;
   a sensor coupled to said movable support rod;
   mounting means coupled to slidably retain said support rod for movement along an axis;
   a limit switch coupled to said mounting means to be closed upon movement of said sensor to a preselected position;
   means coupled to said support rod for closing said limit switch during movement of the rod along said axis;
   means extending from said support rod;
   a movable arm having one end positioned in contact with and beneath said extending means so that said extending means rests thereon;
   means coupled to said mounting means and to said arm for moving said arm to allow said rod and sensor to move along said axis;
   actuator switch means electrically coupled to said moving means for selectively providing power to said moving means as an incident of actuation of said actuator switch means;
   relay means responsive to said actuator switch means and to closure of said limit switch for providing power to cause movement of a machine tool; and
   a disconnect switch means coupled to said relay means and responsive to the end of a machine stroke for terminating said power causing machine tool movement, said relay means including a first relay having associated normally open contacts and normally closed contacts, said first relay being responsive to said actuator switch means to close said normally open contacts and open said normally closed contacts upon closure of said limit switch, and a second relay having associated normally open contacts, said second relay being coupled to said disconnect switch means and responsive to power received from said actuator switch means for closing said normally open contacts of said second relay.

8. The machine control system of claim 7 wherein said disconnect switch means includes a normally closed switch which is coupled to open when the machine tool reaches the end of its stroke.

9. The machine control system of claim 7 wherein a said associated normally open contact of said first relay and a said associated normally open contact of said second relay are electrically coupled in series to provide said power for causing machine tool movement as a result of both being closed at the same time.

10. The machine control system of claim 8 wherein a said associated normally closed contact of said first relay and a said associated normally open contact of said second relay are coupled in electrical parallel with each other and in electrical series with said normally closed disconnect switch.

11. The machine control system of claim 9 wherein another one of said normally open contacts associated with said first relay is connected to maintain said relay energized upon energization thereof by actuation of said actuator switch.

* * * * *